(12) United States Patent
Chen et al.

(10) Patent No.: US 7,751,599 B2
(45) Date of Patent: Jul. 6, 2010

(54) METHOD FOR DRIVING VIRTUAL FACIAL EXPRESSIONS BY AUTOMATICALLY DETECTING FACIAL EXPRESSIONS OF A FACE IMAGE

(75) Inventors: Ji Chen, Hangzhou (CN); Jin Wang, Hangzhou (CN); Lin Wang, Shanghai (CN)

(73) Assignee: ArcSoft, Inc., Fremont, CA (US)

( * ) Notice: Subject to any disclaimer, the term of this patent is extended or adjusted under 35 U.S.C. 154(b) by 1001 days.

(21) Appl. No.: 11/501,009

(22) Filed: Aug. 9, 2006

(65) Prior Publication Data

US 2008/0037836 A1 Feb. 14, 2008

(51) Int. Cl.
*G06K 9/00* (2006.01)
*G06K 9/46* (2006.01)
*G06K 9/62* (2006.01)
(52) U.S. Cl. ................. 382/118; 382/103; 382/192; 382/215; 382/225
(58) Field of Classification Search ........... 382/181, 382/118, 103, 192, 215
See application file for complete search history.

(56) References Cited

U.S. PATENT DOCUMENTS

| | | | | |
|---|---|---|---|---|
| 6,272,231 B1* | 8/2001 | Maurer et al. | ............... | 382/103 |
| 6,300,960 B1* | 10/2001 | DeRose et al. | ............... | 345/474 |
| 6,301,370 B1* | 10/2001 | Steffens et al. | ............... | 382/103 |
| 6,563,950 B1* | 5/2003 | Wiskott et al. | ............... | 382/209 |
| 6,714,661 B2* | 3/2004 | Buddenmeier et al. | ...... | 382/103 |
| 6,834,115 B2* | 12/2004 | Maurer et al. | ............... | 382/103 |
| 2004/0228528 A1* | 11/2004 | Lao | ............... | 382/167 |
| 2006/0050933 A1* | 3/2006 | Adam et al. | ............... | 382/118 |

\* cited by examiner

*Primary Examiner*—Bhavesh M Mehta
*Assistant Examiner*—Kathleen S Yuan
(74) *Attorney, Agent, or Firm*—Bacon & Thomas, PLLC (57) ABSTRACT

A method for driving virtual facial expressions by automatically detecting facial expressions of a face image is applied to a digital image capturing device. The method includes the steps of detecting a face image captured by the image capturing device and images of a plurality of facial features with different facial expressions to obtain a key point position of each facial feature on the face image; mapping the key point positions to a virtual face as the key point positions of corresponding facial features on the virtual face; dynamically tracking the key point of each facial feature on the face image; estimating the key point positions of each facial feature of the current face image according to the key point positions of each facial feature on a previous face image; and correcting the key point positions of the corresponding facial features on the virtual face.

17 Claims, 8 Drawing Sheets

METHOD FOR DRIVING VIRTUAL FACIAL EXPRESSIONS BY AUTOMATICALLY DETECTING FACIAL EXPRESSIONS OF A FACE IMAGE

FIELD OF THE INVENTION

The present invention relates to a method for driving virtual facial expressions, and more particularly to a method for driving virtual facial expressions by automatically detecting facial expressions of a face image.

BACKGROUND OF THE INVENTION

As the digital camera technology advances rapidly in recent years, various electronic devices (such as digital cameras and camcorders, etc) are introduced constantly to the market. Not only the quality becomes increasingly higher, but the volume of products also becomes increasingly less, and their market price becomes lower gradually. These electronic image capturing devices available in the market become popular, and they are installed and applied extensively to different computer devices (such as digital personal assistants and notebook computers) and communications devices (such as mobile phones and video-conferencing phones), so that users can communicate with each other online through computers or communications devices or send real-time images captured by the digital image capturing devices in the online communication process, and a user can know about the facial expressions of the other party from the received real-time images.

In our communications, a facial expression generally plays an important role. The facial expressions not only reflect the attitudes of a person, but also express the feelings of our happiness, anger, sorrow, and joy, and thus the online videoconference communications through computers or communications devices are better than traditional network communications, and naturally attract more attentions of consumers. However, the images captured by digital image capturing device in the videoconference or chatting conducted over existing computers or communications devices also include images other than a face and facial expressions such as the image of the environment where the photographer is located, and the image of the photographer's body. Therefore, if the environment of the photographed person is very private (such as the bedroom) or the clothing (such as underwear) is not suitable to be revealed to the public, then the online videoconferencing or chatting is not appropriate to be held through computers or communications devices. Since the image captured instantly by the digital image capturing device usually involves a larger quantity of data, it requires a broader bandwidth for transmitting the data over the network. The video images cannot be transmitted instantly to the opposite party, and a delay will occur during the videoconference or chatting conducted through a narrower band of network, and both parties cannot have actual feelings and joys of chatting. Therefore, finding a way of transmitting a user's facial expressions for a videoconference or a chatting over the network, such that the opposite party can see the facial expressions without revealing the chatting location or personal privacy becomes a subject for videoconferencing system designers and manufacturers.

SUMMARY OF THE INVENTION

In view of the foregoing shortcomings of the prior art, the inventor of the present invention based on years of experience to conduct extensive researches and experiments and finally invented a method for driving virtual facial expressions by automatically detecting facial expressions of a portrait.

Therefore, it is a primary objective of the present invention to overcome the foregoing shortcomings by providing a method for driving virtual facial expressions by automatically detecting facial expressions of a face image.

Another objective of the present invention is to automatically detect a face image captured by a digital image capturing device and an image with a plurality of facial features (such as eyebrow, eyes, nose and mouth, etc) showing different facial expressions on the face image to obtain key point positions of each facial feature on the face image, and map the key point positions to a virtual face as the key point positions of the corresponding facial features on the virtual face, and then track the key point of each facial feature of the face image to estimate the key point position of each facial feature on the current face image according to the key position of each facial feature of the previous face image, and correct the key point positions of the corresponding facial features on the virtual face, such that when a user chats over the network, the digital image capturing device can drive the corresponding facial expressions of each facial feature on the virtual face according to the facial expressions of each facial feature on the face image, and instantly send out the virtual face image to be recognized by the opposite party, and assure that the chatting position or privacy will not be revealed. Since it is not necessary to transmit real images having a large quantity of data, an online chatting or videoconference can be conducted in an environment of a narrowband network.

Another objective of the present invention is to detect the image of a user's facial feature captured by the digital image capturing device and automatically recognize the initial position of the key point of each facial feature, and then use a Gabor wavelet algorithm to detect the surrounding of the initial position, so as to obtain more accurate key point positions.

A further objective of the present invention is to detect a first image captured at each key point position of the facial feature of a face image and then track other captured images one by one to obtain the position of the key points and the user's parameters of the instant facial expressions, so as to drive the virtual face image and simulate the user's real facial expressions.

Another further objective of the present invention is to use an optical flow method in the tracking process to estimate the motion, and estimate rough positions of the key points of the current face image by the key point positions of a previous face image, and then use the Gabor characteristics for accurately locating the position and obtaining the exact position of the key point in the current face image.

Another objective of the present invention is to automatically determine whether or not the accuracy of obtaining the key point position is below a predetermined standard when each key point position of a facial feature of a face image is tracked. If the accuracy of each key point positions is below the predetermined standard, the tracking of each key point position of the facial feature of the face image will be stopped, and then a face image captured in the image and the images of a plurality of facial features with different facial expressions are detected and calibrated.

Another objective of the present invention is to compare the similarities of optical flows between a current face image and a previous face image; if the tracking cannot be performed accurately in certain situations such as the face image being inclined too much, an average similarity of the Gabor characteristic of the key point will be examined to measure the accuracy of the current tracked key point positions. If the accuracy is too low, then the face image of the captured image and the images of a plurality of facial features showing different facial expressions will be detected and calibrated again.

Another objective of the present invention is to train and use the distribution of the positions of the key points and the statistics of the key points to pull some of the shifted key points back to the more accurate positions, when the key points are deviated too much from the average position obtained by the statistics due to noises.

The above and other objects, features and advantages of the present invention will become apparent from the following detailed description taken with the accompanying drawings.

DETAILED DESCRIPTION OF THE PREFERRED EMBODIMENTS

Figure 1:
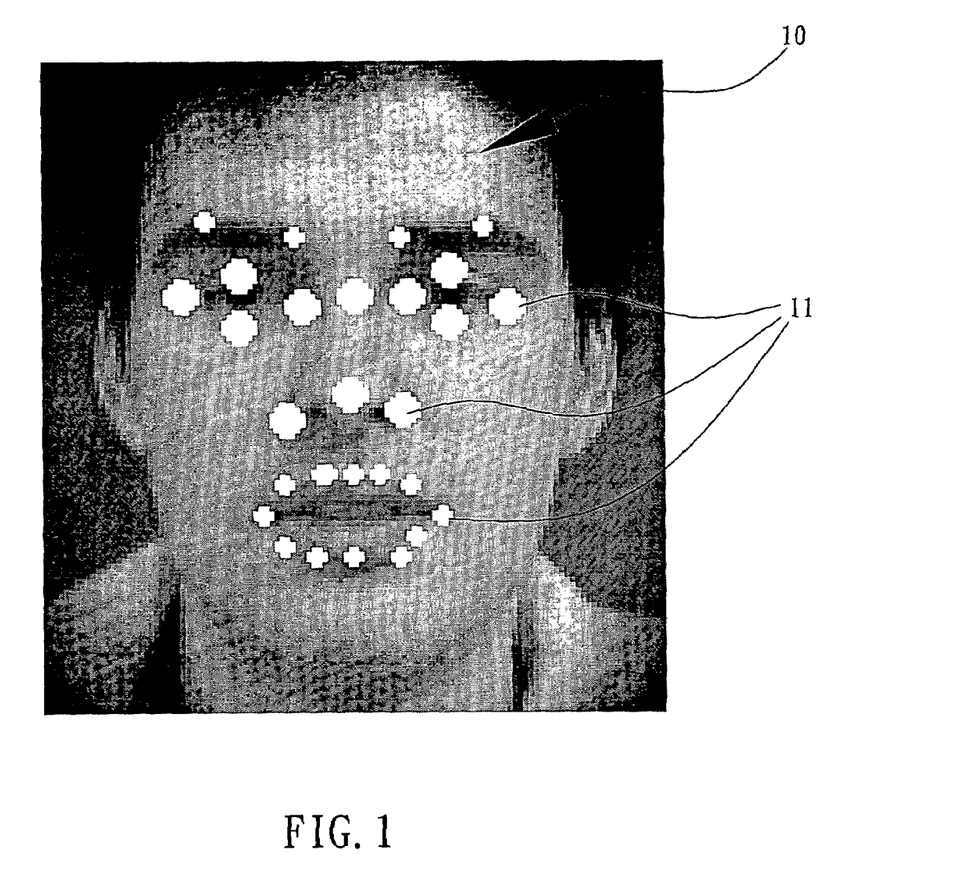
FIG. 1 is a schematic view of the positions of facial features on a face image according to a preferred embodiment of the present invention.

The present invention discloses a method for driving virtual facial expressions by automatically detecting facial expressions of a face image, and the method is applied to a digital image capturing device and comprises the steps of detecting a face image captured by the image capturing device and images of a plurality of facial features (such as eyebrow, eyes, nose and mouth, etc) with different facial expressions to obtain a key point position of each facial feature on the face image; mapping the key point positions to a virtual face as the key point positions of corresponding facial features on the virtual face; dynamically tracking the key point of each facial feature on the face image; estimating the key point position of each facial feature of the current face image according to the key point position of each facial feature on a previous face image; and correcting the key point positions of the corresponding facial features on the virtual face. In this invention, the digital image capturing device generally refers to various different digital image capturing devices (such as digital cameras and digital camcorders, etc) or various computer devices that install the digital image capturing devices (such as digital personal assistants and notebook computers, etc) or communications devices (such as mobile phones and video-conferencing phones, etc), and the key points of the facial features refer to each facial feature showing a plurality of key points of different facial expressions, and the quantity and position of the key points defined by the facial features may vary according to actual needs and the level of complexity of the computations. Referring to FIG. 1 for a preferred embodiment of the present invention, a face image 10 captured by the digital image capturing device defines the following 28 key points 11, wherein the extent of openness and shape of eyes and mouth have significant effects on the facial expressions, and thus requiring more defined key points:

(1) Both eyebrows define 4 key points, which are the highest points at the edge of the left and right eyebrows and the tips at the inner side of the edge of the left and right eyebrows.

(2) Both eyes define 8 key points, which are the points at the corners of the eyes and the points at the middle of the eyelids;

(3) The nose defines 4 key points which are the points on both sides of the nasal wings (situated at the positions with the maximum curvature), the points at the nasal bridge (basically situated at the middle point on a line joining the centers of both eyes, and the point at the nose tip; and (4) The mouth defines 12 key points which are points disposed equidistantly with each other along the external edge of the lip.

Figure 2:
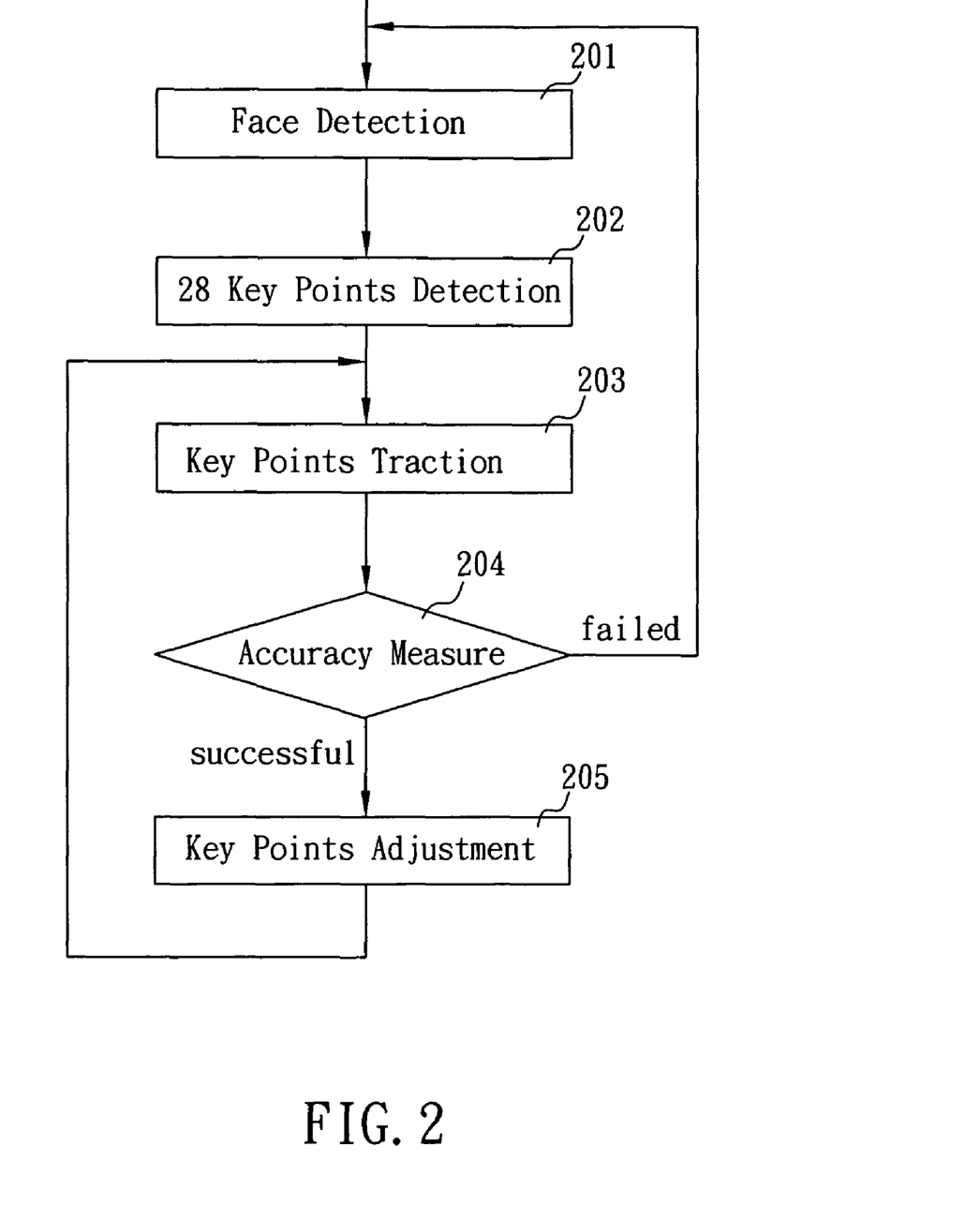
FIG. 2 is a flow chart of a method of the present invention.
Figure 3:
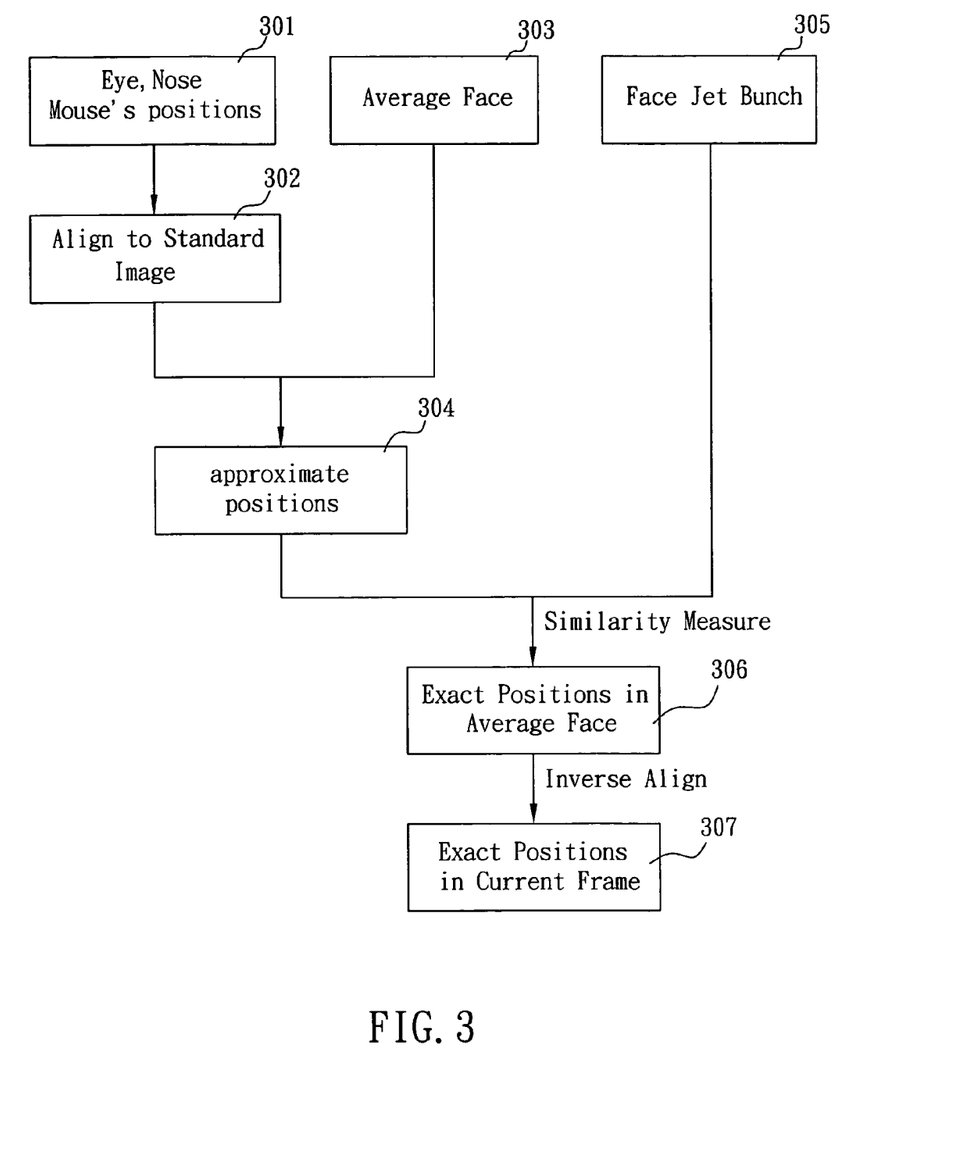
FIG. 3 is a flow chart of processing a face detection block according to the present invention.
Figure 4:
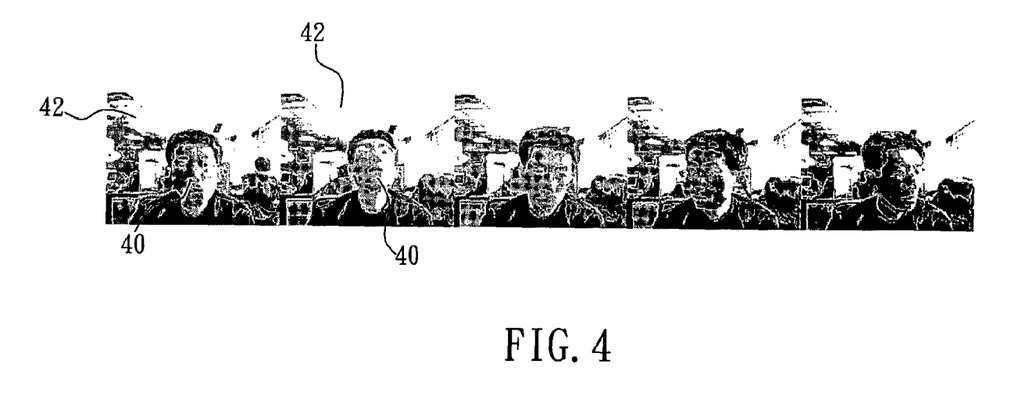
FIG. 4 is a schematic view of capturing an image by a digital image capturing device and automatically detecting a face according to the present invention.

Referring to FIG. 2, the method in accordance with the present invention comprises five modules: detecting a face; detecting a key point, tracking a key point, measuring an accuracy, and adjusting a key point distribution, for detecting the face image captured by the digital image capturing device and finding the exact positions of the 28 key points of the facial features and dynamically tracking the key points to drive the facial expressions of a virtual face:

(201) In a face detection block, the following procedure as shown in FIG. 3 is performed:

(301) Firstly, the digital image capturing device captures images one by one. In the description of the present invention, each image is called a target image. Referring to FIG. 4, a face detection is performed automatically for a face 40 in the target image. In the meantime, the positions of eyes, nose and mouth on the target image are detected. The invention adopts a traditional algorithm for detecting the face, and such algorithm has been disclosed in journals such as the Adaboost algorithm, Haar wavelet feature and related recognition technology with OpenCV face detection software, and the detection software include the training of a large number of face image samples, and the valid Haar wavelets obtained from the front face, eyes, nose and mouth and the face categorizer (used for determining whether the image is a face or not a face) can be used for detecting and recognizing the face, eyes, nose and mouth in the target image quickly. Since the detection algorithm is a prior art, and thus will not be described here.

Figure 5:
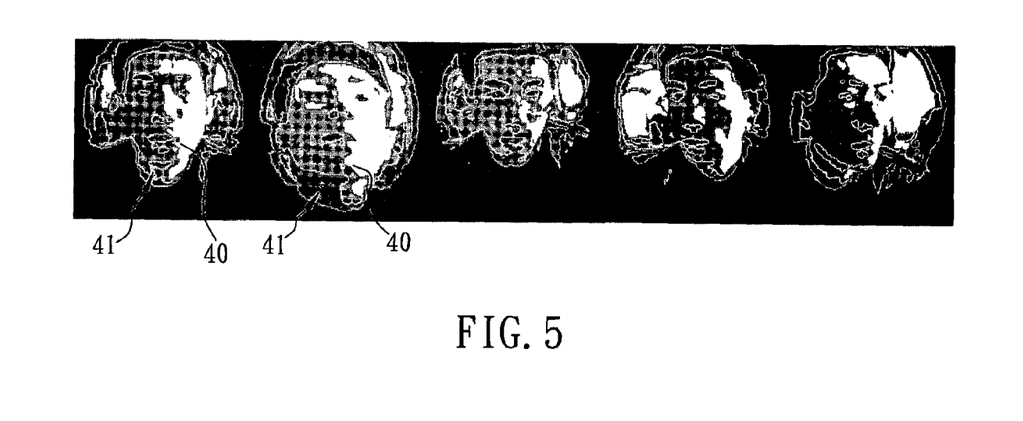
FIG. 5 is a schematic view of performing a maskmaking to a face to remove the figure at the edge of the face image according to the present invention.

(302) After the positions of eyes, nose and mouth in the target image are detected, the target image is converted into a standard image, and the standard image is a grayscale figure having a fixed size (such as 160×160). Referring to FIG. 4 for a practical application, the front of a face 40 is used as the center to produce a moldboard 41 with an oval hole and process a maskmaking of the face 40. Referring to FIG. 5, a FIG. 42 at the edge of the face 40 is removed, and then the target image is converted into a standard image, so as to reduce the effect of the FIG. 42 at the edge of the face 40 on the standard image during the conversion process. Further, a specific mapping and conversion (such as shift, rotate, zoom or alternate) is generally required during the process of converting a target image into a standard image, so as to center the front face without any inclination.

Figure 6:
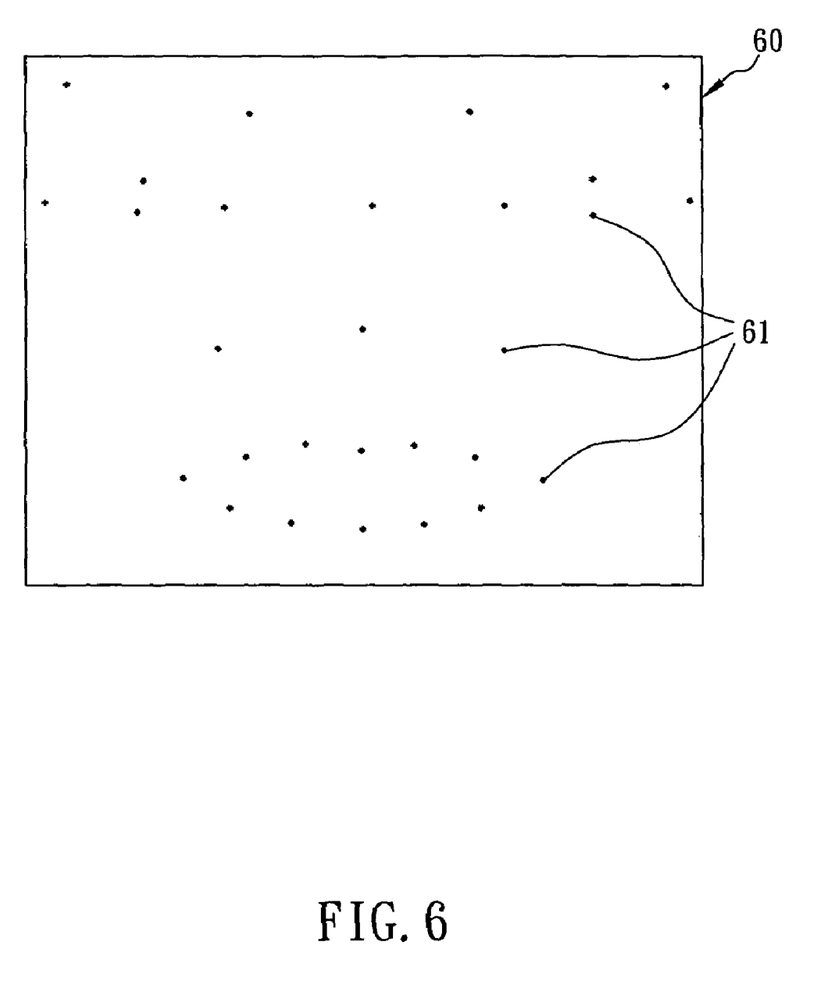
FIG. 6 is a schematic view of the average positions of a standard image at each key point on face image samples obtained by training and correcting a large number of front face image samples according to the present invention.

(303) A large number of front face image samples are trained and corrected in advance, and an average position of each key point 61 of the face image sample on the standard image 60 as shown in FIG. 6 is obtained, and such face image is called an average face in this invention.

(304) A fitting or regression is performed for the positions of eyes, nose and mouth on the target image and the average face, such that the curve of key points of eyes, nose and mouth on the target image fits a certain point on the parameter curve, so as to fit the average face to obtain six geometry or affine transformation parameters between the characteristics of the target image and the average face, and these parameters are called warp parameters in this invention, and the parameters can convert the original image into a sub-image, and such conversion process is called an image warping in this invention. By the image warping, the initial positions of all key points of eyes, nose and mouth of the target image on the standard image are detected. Since the standard image corresponds to the front gesture of a face, therefore the position of each key point on the average face can be reasonably estimated as the position of each key point on the standard image, and the only difference resides on a small error caused by the difference of the shape or the angle of the face.

(202) In a key point detection block, the following procedure as shown in FIG. 3 is performed:

(305) A Gabor wavelet algorithm is used, and a Gabor Jet of each key point in a series of face image samples (including male, female, elderly and youngster) is used to form a Gabor Jet Bunch. As the Gabor wavelet is a product of a trigonometric function and a Gaussian function, and its 2D function is in the form of:

$$W(x, y, \theta, \lambda, \varphi, \sigma, \gamma) = e^{-\frac{(x\cos(\theta)+y\sin(\theta))^2 + \gamma^2(-x\sin(\theta)+y\cos(\theta))^2}{2\sigma^2}} \cos\left(2\pi \frac{x\cos(\theta) + y\sin(\theta)}{\lambda} + \varphi\right)$$

where $\theta$ is a wavelet direction, $\lambda$ is a wavelet wavelength, ($\phi$ is a wavelet phase, $\sigma$ is the size of a function of the Gaussian function, and $\gamma$ is an aspect ratio of the Gaussian function. In this embodiment, each key point of the face image sample is sampled, and different directions, wavelengths and phases of the Gabor wavelet are used for the following computation:

$$S_\phi(J_0, J_i) = \frac{\sum_{j=1}^{N} a_0 a_i \cos(\phi_0 - \phi_i)}{\sqrt{\sum_{j=1}^{N} a_0^2 \sum_{j=1}^{N} a_i^2}}$$

to produce a series of complex numbers which are the Gabor Jets of the key points. A series of Gabor Jets for each key point of the face image samples (including male, female, elderly and youngster) form a Gabor Jet Bunch, and thus the similarity of corresponding key points can be determined by comparing the similarity (of their direction, wavelength and phase) of the Gabor Jets of the corresponding key points of two face images. It is noteworthy to point out that the Gabor Jet Bunch algorithm is a prior art and thus will not be described here.

(306) The exact positions of all key points of eyes, nose and mouth of the target image on the standard image are calculated. Referring to FIG. 6 for the calculation of the exact positions of all key points, a point in a small neighborhood (such as 8×8) at an initial position of each key point 61 of the standard image 60 is used as a selecting point, and then the Gabor Jets at the initial positions of all key points of the eyes, nose and mouth of the standard image on the target image are compared with each Gabor Jet in the Gabor Jet Bunch, and then a specific number of Gabor Jets having a high similarity in the Gabor Jet Bunch are used as the exact positions of the corresponding key points of the target image on the standard image.

(307) The exact positions of all key points of the standard image are aligned inversely to the target image and calibrated as the exact positions of all key points of the eyes, nose and mouth on the target image.

(203) In a key point tracking block, the positions of all key points on the target image are tracked. In this embodiment, an optical flow technique is used to estimate the motion of each key point, and the method applies the following two assumptions to two related target images:

1. Constancy of optical flow: the observed brightness of a specific point on any target image remains constant with time.

2. Smoothness of speed: the points in the neighborhood of a target image move with a smooth speed.

Figure 7:
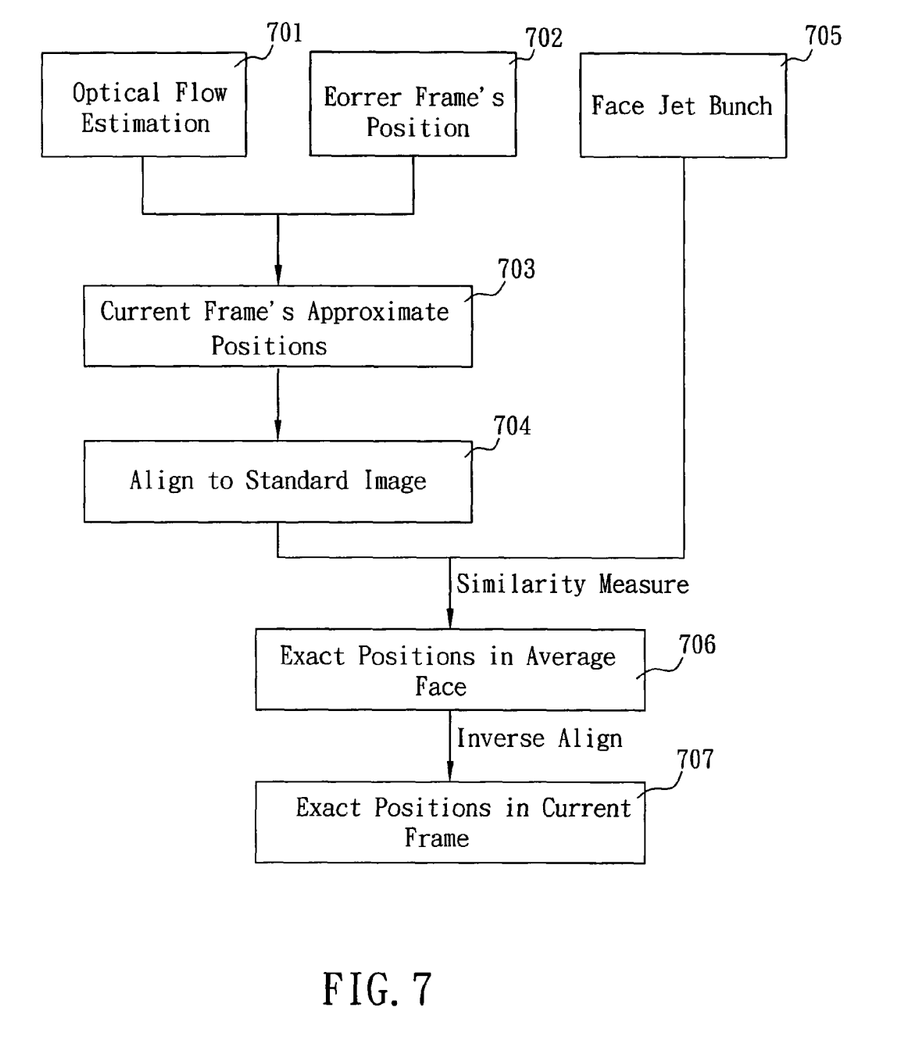
FIG. 7 is a flow chart of processing a key point tracking block according to the present invention.

Based on the foregoing two assumptions, the key point positions on a previous target image can be used to obtain the corresponding key point positions of a current target image. Referring to FIG. 7, the key point tracking block tracks the key point according to the following procedure and repeats the procedure after the calibration, until the automatic tracking process discovers a failure or exits from the procedure.

(701) An optical flow technique is used to obtain a motion parameter (dx, dy) between the corresponding key point of two successive target images.

(702) The error $\epsilon$(dx, dy) of the motion parameter (dx, dy) of the corresponding key points of the two successive target images can be computed by the formula given below:

$$\epsilon(d) = \epsilon(dx, dy) = \Sigma\Sigma(I(x,y) - J(x+dx, y+dy))^2.$$

(703) The values of dx, dy that minimize the error $\epsilon$(dx, dy) are calculated, and a specific key point position on the previous target image is used to obtain an estimated position of the corresponding key point of the current target image.

(704) A fitting or regression is performed on the estimated position of the key points of the current target image and the key point positions of the average face to obtain a warp parameter (the fitting or regression in accordance with this embodiment is conducted by a linear transformation, and thus only four parameters are used for performing the image warping), and then the estimated positions of all key points of eyes, nose and mouth of the current target image can be calculated for the standard image.

(705) As described above, the Gabor wavelet algorithm is adopted, and a series of Gabor Jets for each key points of a series of face image samples (including male, female, elderly and youngster) are used to form a Gabor Jet Bunch.

(706) When the exact positions of all key points of the eyes, nose and mouth of the current target image on the standard image are calculated, a point in a small neighborhood (such as 8×8) of an estimated position of each key point of the standard image is used as a selecting point, and then the Gabor Jets at the estimated positions of all key points of eyes, nose and mouth of the current target image on the standard image are compared with each Gabor Jet of the Gabor Jet Bunch, and the selecting point having the highest similarity of a specific number of Gabor Jets in the Gabor Jet Bunch as the exact position of the corresponding key point of the current target image on the standard image.

(707) The exact positions of all key points of the standard image are aligned inversely to the current target image, and the exact positions of the key points of eyes, nose and mouth of the target image are calibrated.

(204) In an accuracy measurement module, an excessively large inclination of the front face may fail to accurately track certain key points of the facial features. To overcome this drawback, the invention uses the following two methods to measure the accuracy of tracking the key points instantly:

1. The similarities of the optical flows of a previous target image and a current target image are compared; and
2. The average similarity of the Gabor characteristics of all key points on the target image is examined.

In general, the position of a key point of a target image will be detected in the first target image. The invention will track each key point detected from other target images thereafter, and will immediately report its exact position, so as to obtain the facial expression parameter for driving a virtual face corresponding to the standard image, such that the virtual face can simulate a user's real facial expressions and produce the corresponding facial expressions of the facial features with respect to each key point. It is noteworthy to point out that users have to maintain a front face gesture when the invention detects the face and its key points. Although the face can be moved within a specific angle or range, different gestures and facial expressions can be made. Basically, the images of the facial features should be captured normally by the digital image capturing device, and the range of the motion of the face should not exceed the visible range of the camera lens, so that the present invention can use the foregoing two methods to measure the accuracy of the key points and determine whether or not the tracking is successful. In FIG. 2, if the accuracy is determined to be too low, the tracking will be considered as failed. Now, the face detection block (201) is performed to detect and calibrate the face and its key point again.

Figure 8:
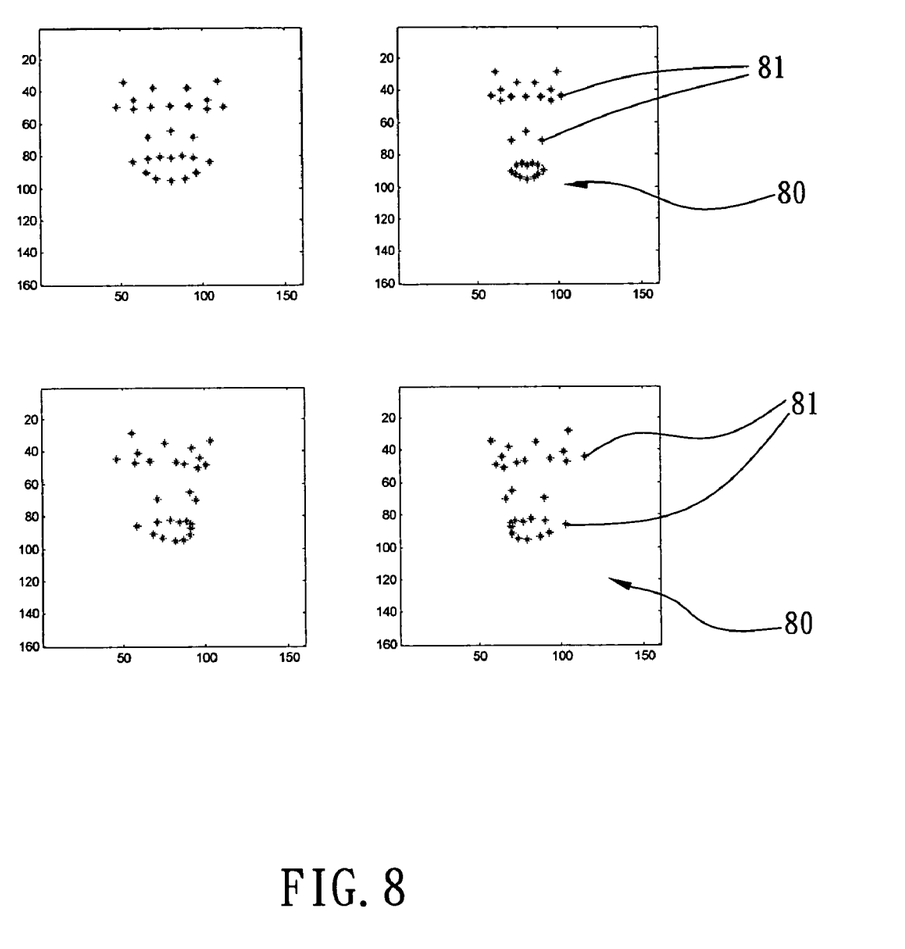
FIG. 8 is a schematic view of a key point distribution model produced by a key point distribution adjustment module according to the present invention.
Figure 9:
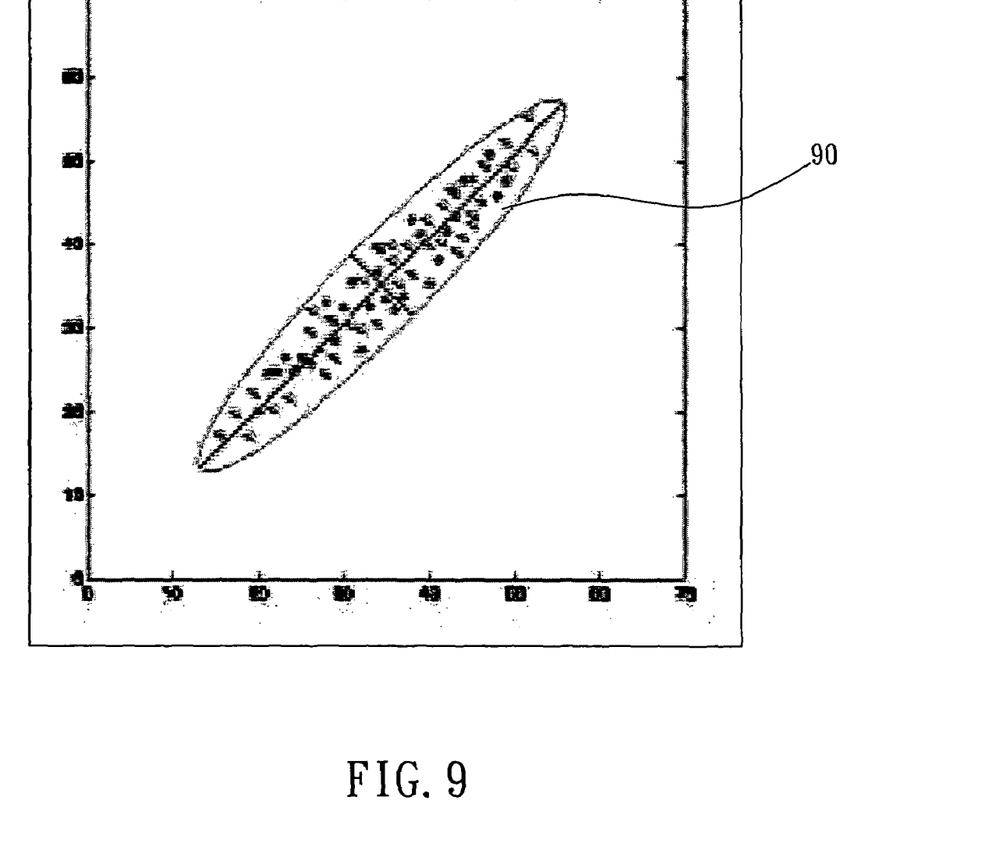
FIG. 9 is a schematic view of a point cloud distribution obtained from a principal component of a key point distribution adjustment module according to the present invention.

(205) In a key point distribution adjustment module, the tracking of each key point is independent, and certain noises may deviate the key point from its normal position during a normal tracking process, and thus the invention trains a large number of front face samples (including different gestures and facial expressions) to obtain statistics of the distribution of each key point on the front face and the relation of distribution positions of these key points on the standard image. In FIG. 8, the invention calls the foregoing model as a point distribution model 80, and the key point distribution model 80 not only can obtain an average distribution position of the key points 81, but also can obtain the range of converting the key points 81. In the space of the model, the dimension of each face image sample is 2×N (where N is the number of key points). In every 2×N dimensional hyperspace, a high correlation exists between two adjacent key points of the facial features including the limitation of a specific space exists between the positions of eyes and eyebrows. The invention uses such correlation to obtain the first N principal components, and focuses on the distribution of key points to perform a principal component analysis (PCA) based on the following formula:

$$V' = \overline{V} + \sum_{i=1}^{m} e_i \tilde{v}_i$$

where, V is a sample vector, e is a facial expressions vector, and V' is a reconstructed sample vector, for adjusting the position of the key point, so as to achieve the effect of reducing information redundancy. The computation method assumes that all sample data constitute a 2×N point cloud 90. Referring to FIG. 9, the principal component analysis can be used to obtain each main axis of the distribution of the point cloud 90 (which is the principal component) and thus the sample vector V can be projected onto the subspace composed of the foregoing principal components. The invention not only significantly reduces the processing dimensions, but also uses the limitation relation between the key points to make the following adjustments for the key points on the standard image:

1. The key points are combined to form a sample vector V which is projected onto the space of a principal component to obtain a facial expression vector e.
2. A new facial expression vector e' can be obtained from a reasonable range of components of the facial expression vector e.
3. The new facial expressions vector e' is projected back onto the sample space to obtain a reconstructed sample vector V'.

If the position of a certain key point is deviated too much from an average position calculated by statistics due to the noises occurred during the normal tracking process, this embodiment will pull the deviated position back to a more accurate position according to the average position of the key point distribution model.

In summation of the description above, the operations of the foregoing modules are automatic without requiring any user's operation to capture, detect and dynamically track the image of a face and its facial features in order to obtain the exact position of each key point, and the facial expressions of the facial features of the face image drive the facial features of the virtual face to produce corresponding facial expressions, so that a user can transmit the virtual face image with facial expressions to the opposite party for recognition during a videoconference or a chatting over the network, without the need of transmitting a real image having a large number of data. The invention not only assures the user's privacy, but also allows users to conduct a videoconference or a chatting over a narrowband network environment.

While the invention herein disclosed has been described by means of specific embodiments, numerous modifications and variations could be made thereto by those skilled in the art without departing from the scope and spirit of the invention set forth in the claims.

What is claimed is:

1. A method for driving virtual facial expressions by automatically detecting facial expressions of a face image, which is applied to a digital image capturing device, comprising:

learning and correcting a plurality of front face image samples to obtain an average position of each key point of a face, eyes, a nose and a mouth of each of said front face image samples on a standard image for imitating a virtual front face, wherein said standard image is a greyscale figure having a fixed size and using a front face as a center without an inclination;

using a Gabor wavelet algorithm to sample a series of Gabor Jets from said key points of said front face image samples to form a Gabor Jet Bunch;

automatically detecting positions of a face, eyes, a nose and a mouth in a target image captured by said digital image capturing device, and converting said positions onto said standard image;

performing a fitting or regression calculation for said positions of eyes, nose and mouth of said target image and said average positions corresponding thereto to obtain initial positions of key points of eyes, nose and mouth of said target image on said standard image;

calculating exact positions of said key points of said target image on said standard image by using a point within a neighborhood of each of said initial positions as a selecting point, comparing a Gabor Jet of each of said initial positions with each of said Gabor Jets in said Gabor Jet Bunch, selecting said Gabor Jet in said Gabor Jet Bunch having a highest similarity with said selecting point as said exact position of said key point on said standard image corresponding to said key point of said target image, inversely aligning said exact positions of said key points on said standard image onto said target image, and labeling said exact positions as exact positions of said key points on said target image; and automatically tracking positions of key points of other target image captured by said digital image capturing device later, and correcting said exact position of said key point on said standard image through obtaining a motion parameter (dx, dy) between said key points corresponding to said target image and said other target image by using an optical flow technique, calculating an error $\epsilon(dx, dy)$ of said motion parameter (dx, dy) according to the following formula, wherein I (x,y) represents gray scales of said target image, J(x,y) represents gray scales of said other target image, and x, y represent coordinates of each of said key points of said target image or said other target image:

$$\epsilon(d)=\epsilon(dx,dy)=\Sigma\Sigma(I(x,y)-J(x+dx,y+dy))^2,$$

to find dx, dy that minimize said error $\epsilon$(dx, dy) and obtain an estimated position of said key point of said other target image based on said position of said key point of said target image corresponding thereto, and performing a fitting or regression calculation for said estimated positions and said average positions to calculate estimated positions of key points of said other target image on said standard image.

2. The method of claim 1 further comprises:

calculating exact positions of said key points of said other target image on said standard image by using a point within a neighborhood of each of said estimated positions of said key points of said other target image on said standard image as another selecting point, comparing a Gabor Jet of each of said estimated positions of said key points of said other target image on said standard image with each of said Gabor Jets in said Gabor Jet Bunch, selecting said Gabor Jet in said Gabor Jet Bunch having a highest similarity with said another selecting point as said exact position of said key point on said standard image corresponding to said other target image.

3. The method of claim 2 further comprises:

comparing similarities of optical flows between said target image and said other target image, and examining an average similarity of said Gabor Jets of said key points on said target image and said other target image to instantly measure a tracking accuracy; and determining whether or not said tracking accuracy matches with a predetermined standard; if yes, then said tracking is determined as successful, or else said tracking is determined as failed, and repeating the previous steps again.

4. The method of claim 3 further comprises:

obtaining a key point distribution model through learning from said front face image samples, wherein said key point distribution model is used to represent a distribution of statistic and position of each of said key points of said front face image samples on said standard image; and determining whether or not said positions of said key points on said standard image deviate from another average position calculated from said statistics and positions of said key point distribution model; if yes, then said position of said key point on said standard image is pulled back to an accurate position close to said another average position.

5. The method of claim 4 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip.

6. The method of claim 2 further comprises:

obtaining a key point distribution model through learning from said front face image samples, wherein said key point distribution model is used to represent a distribution of statistic and position of each of said key points of said front face image samples on said standard image; and determining whether or not said positions of said key points on said standard image deviate from another average position calculated from said statistics and positions of said key point distribution model; if yes, then said position of said key point on said standard image is pulled back to an accurate position close to said another average position.

7. The method of claim 6 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of the wing of said nose, a position of a bridge of said nose and a position of a tip of said nose; and 12 points situated equidistantly along external edges of a lip of said mouth.

8. The method of claim 1 further comprises:

obtaining a key point distribution model through learning from said front face image samples, wherein said key point distribution model is used to represent a distribution of statistic and position of each of said key points of said front face image samples on said standard image; and determining whether or not said positions of said key points on said standard image deviate from another average position calculated from said statistics and positions of said key point distribution model; if yes, then said position of said key point on said standard image is pulled back to an accurate position close to said another average position.

9. The method of claim 8 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip of said mouth.

10. A method for driving virtual facial expressions by automatically detecting facial expressions of a face image, which is applied to a digital image capturing device, comprising:

obtaining a key point distribution model through learning from a plurality of front face image samples, wherein said key point distribution model is used to represent a distribution of statistic and positions of each key point of a face, eyes, a nose and a mouth of each of said front face image samples on a standard image for imitating a virtual front face;

automatically detecting positions of a face, eyes, a nose and a mouth in a target image captured by said digital image capturing device, and converting said positions onto said standard image;

determining whether or not said positions of said key points on said standard image deviate from an average position calculated from said statistics and positions of said key point distribution model; if yes, then said position of said key point on said standard image is pulled back to an accurate position close to said average position;

performing a calculation for said positions of said eyes, nose and mouth of said target image and said distribution of statistics and positions corresponding thereto to obtain initial positions of key points of eyes, nose and mouth of said target image on said standard image;

using said initial positions as exact positions of said key points of said target image on said standard image, and inversely aligning said exact positions onto said target image, and labeling said exact positions as exact positions of said key points on said target image; and automatically tracking positions of key points of other target image captured by said digital image capturing device later, and correcting said exact position of said key point on said standard image.

11. The method of claim 10 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip of said mouth.

12. A method for driving virtual facial expressions by automatically detecting facial expressions of a face image, which is applied to a digital image capturing device, comprising:

obtaining a key point distribution model through learning from a plurality of front face image samples, wherein said key point distribution model is used to represent a distribution of statistic and positions of each key point of a face, eyes, a nose and a mouth of each of said front face image samples on a standard image for imitating a virtual front face, wherein said standard image is a grey-scale figure having a fixed size and using a front face as a center without an inclination;

automatically detecting positions of a face, eyes, a nose and a mouth in a target image captured by said digital image capturing device, and converting said positions onto said standard image;

determining whether or not said positions of said key points on said standard image deviate from an average position calculated from said statistics and positions of said key point distribution model; if yes, then said position of said key point on said standard image is pulled back to an accurate position close to said average position;

performing a calculation for said positions of said eyes, nose and mouth of said target image and said distribution of statistics and positions corresponding thereto to obtain initial positions of key points of eyes, nose and mouth of said target image on said standard image;

using said initial positions as exact positions of said key points of said target image on said standard image, and inversely aligning said exact positions of said key points on said standard image onto said target image, and labeling said exact positions as exact positions of said key points on said target image; and automatically tracking positions of key points of other target image captured by said digital image capturing device later, and correcting said exact position of said key point on said standard image.

13. The method of claim 12 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip of said mouth.

14. A method for driving virtual facial expressions by automatically detecting facial expressions of a face image, which is applied to a digital image capturing device, comprising:

learning and correcting a plurality of front face image samples to obtain an average position of each key point of a face, eyes, a nose and a mouth of each of said front face image samples on a standard image for imitating a virtual front face, wherein said standard image is a grey-scale figure having a fixed size and using a front face as a center without an inclination;

obtaining a key point distribution model through learning from said front face image samples, wherein said key point distribution model is used to represent a distribution of statistic and positions of said key points of said front face image samples on said standard image;

automatically detecting positions of a face, eyes, a nose and a mouth in a target image captured by said digital image capturing device, and converting said positions onto said standard image;

determining whether or not said positions of said key points on said standard image deviate from an average position calculated from said statistics and positions of said key point distribution model; if yes, then said position of said key point on said standard image is pulled back to an accurate position close to said average position calculated from said statistics and positions of said key point distribution model;

performing a fitting or regression calculation for said positions of eyes, nose and mouth of said target image and said average positions calculated from said statistics and positions of said key point distribution model and corresponding thereto to obtain initial positions of key points of eyes, nose and mouth of said target image on said standard image;

using said initial positions as exact positions of said key points of said target image on said standard image, and inversely aligning said exact positions of said key points on said standard image onto said target image, and labeling said exact positions as exact positions of said key points on said target image; and automatically tracking positions of key points of other target image captured by said digital image capturing device later, and correcting said exact position of said key point on said standard image.

15. The method of claim 14 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip of said mouth.

16. A method for driving virtual facial expressions by automatically detecting facial expressions of a face image, which is applied to a digital image capturing device, comprising:

learning and correcting a plurality of front face image samples to obtain an average position of each key point of a face, eyes, a nose and a mouth of each of said front face image samples on a standard image for imitating a virtual front face, wherein said standard image is a greyscale figure having a fixed size and using a front face as a center without an inclination;

obtaining a key point distribution model through learning from said front face image samples, wherein said key point distribution model is used to represent a distribution of statistic and positions of said key points of said front face image samples on said standard image;

using a Gabor wavelet algorithm to sample a series of Gabor Jets from said key points of said front face image samples to form a Gabor Jet Bunch;

automatically detecting positions of a face, eyes, a nose and a mouth in a target image captured by said digital image capturing device, and converting said positions onto said standard image;

determining whether or not said positions of said key points on said standard image deviate from an average position calculated from said statistics and positions of said key point distribution model; if yes, then said position of said key point on said standard image is pulled back to an accurate position close to said average position calculated from said statistics and positions of said key point distribution model;

performing a fitting or regression calculation for said positions of eyes, nose and mouth of said target image and said average positions calculated from said statistics and positions of said key point distribution model and corresponding thereto to obtain initial positions of key points of eyes, nose and mouth of said target image on said standard image;

calculating exact positions of said key points of said target image on said standard image by using a point within a neighborhood of each of said initial positions as a selecting point, comparing a Gabor Jet of each of said initial positions with each of said Gabor Jets in said Gabor Jet Bunch, selecting said Gabor Jet in said Gabor Jet Bunch having a highest similarity with said selecting point as said exact position of said key point on said standard image corresponding to said key point of said target image, inversely aligning said exact positions of said key points on said standard image onto said target image, and labeling said exact positions as exact positions of said key points on said target image; and automatically tracking positions of key points of other target image captured by said digital image capturing device later, and correcting said exact position of said key point on said standard image.

17. The method of claim 16 further comprises:

defining 28 points as said key points of said target image or said other target image, wherein said key points includes four points situated at a highest position of an upper edge of each of two eyebrows of said eyes and tips of internal sides of said upper edges; eight points situated at corners of said eyes and middle positions of eyelids of said eyes; four points situated at both sides of wing of said nose, a position of a bridge of said nose and a position of a tip of said nose; and 12 points situated equidistantly along external edges of a lip of said mouth.

* * * * *